A. C. EASTWOOD.
CONTROL SYSTEM FOR ELECTRIC MOTORS.
APPLICATION FILED MAY 24, 1909.
943,011.
Patented Dec. 14, 1909.
4 SHEETS—SHEET 1.
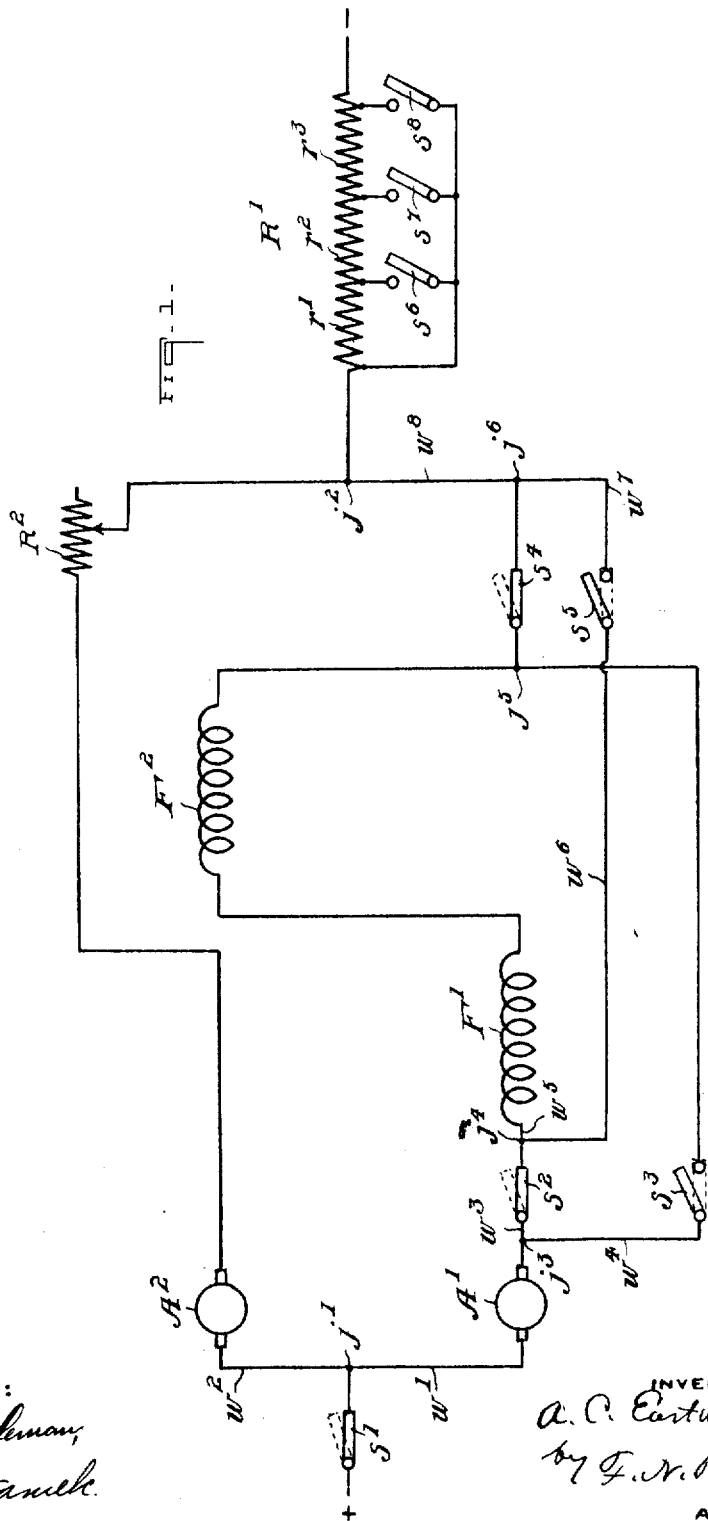

A. C. EASTWOOD.
CONTROL SYSTEM FOR ELECTRIC MOTORS.
APPLICATION FILED MAY 24, 1909.
943,011.
Patented Dec. 14, 1909.
4 SHEETS—SHEET 2.
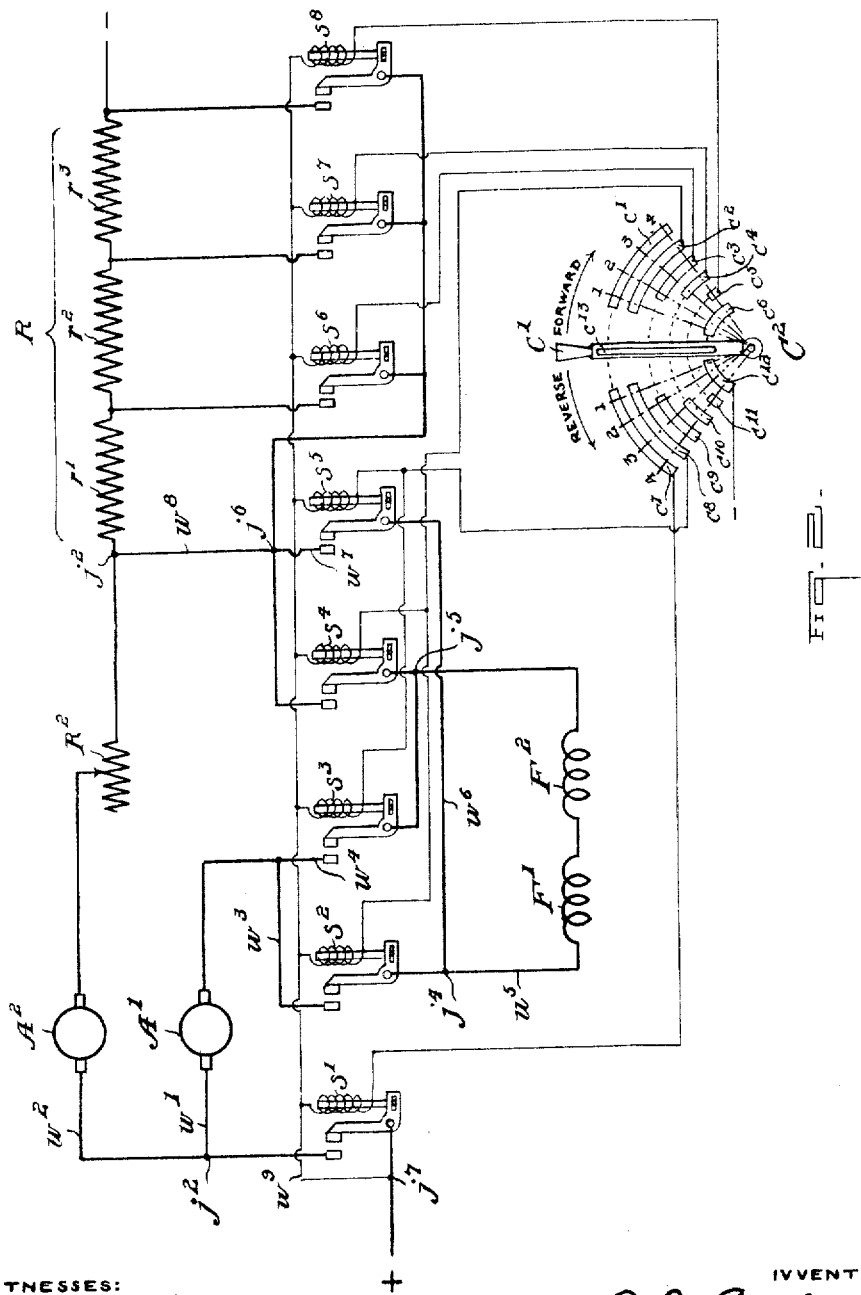
WITNESSES:
INVENTOR
A. C. Eastwood
by F. N. Barber
ATTORNEY

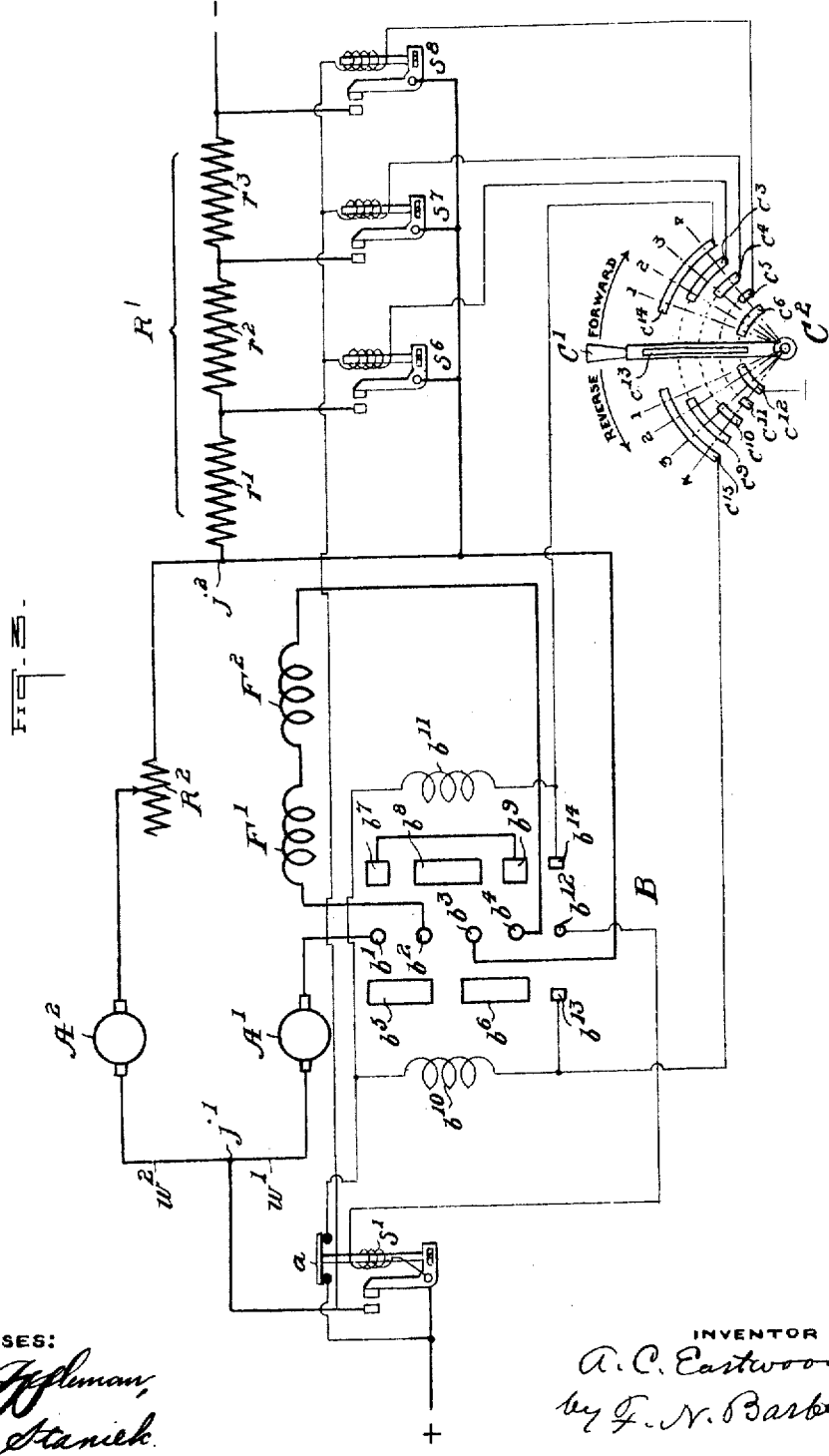

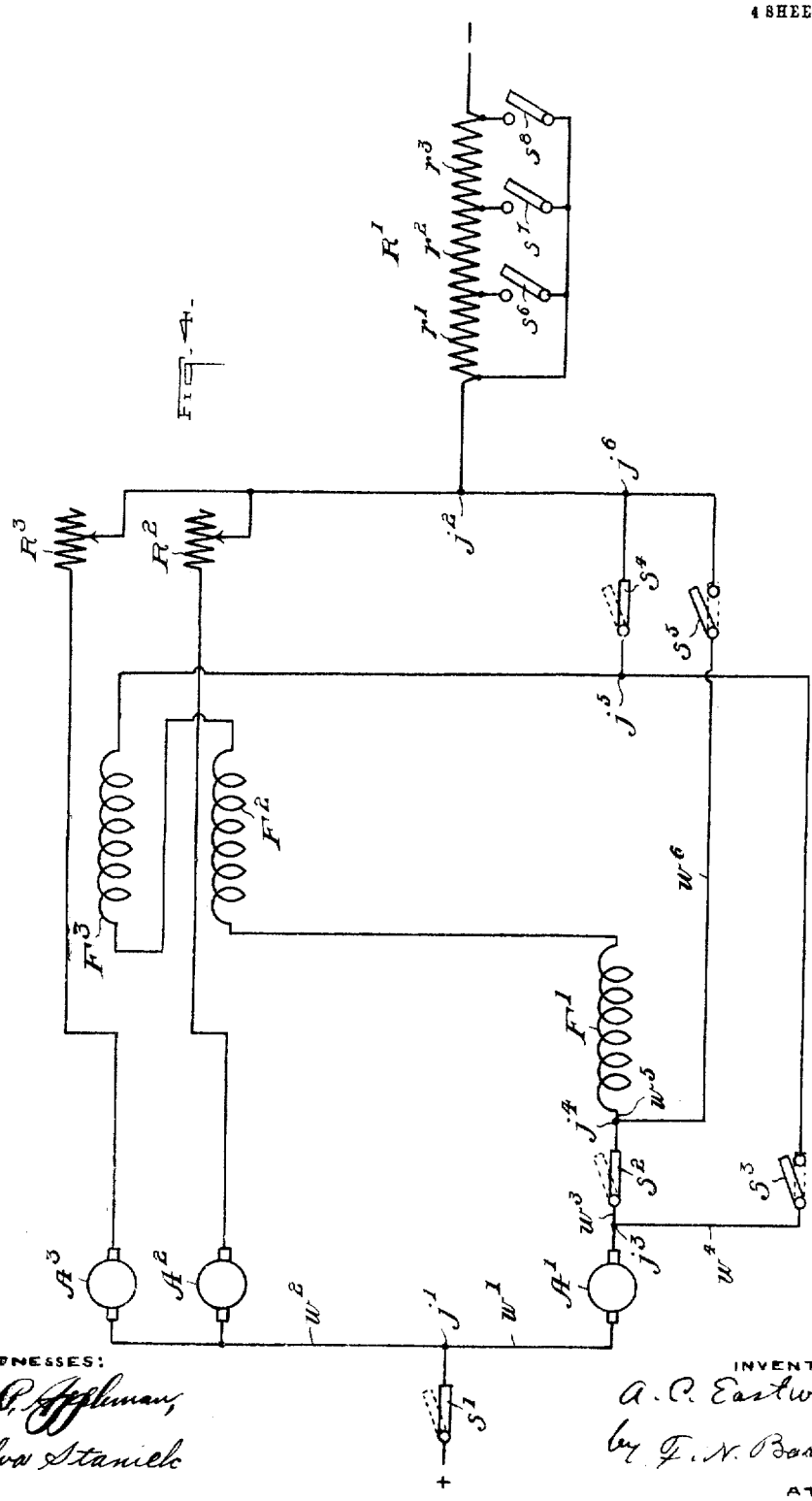

UNITED STATES PATENT OFFICE.

ARTHUR C. EASTWOOD, OF CLEVELAND, OHIO.

CONTROL SYSTEM FOR ELECTRIC MOTORS.

943,011. Specification of Letters Patent. Patented Dec. 14, 1909.

Application filed May 24, 1909. Serial No. 497,949.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Control Systems for Electric Motors, of which the following is a specification.

My invention relates to control systems for two or more electric motors having series fields.

When two electric motors having series fields are connected to drive the same mechanism, it is the usual practice to operate them in parallel or series-parallel; but owing to slight inaccuracy of manufacture, it is found in nearly every instance where the motors are connected in parallel that the load will not be equally divided between them. If one of the motors generates a greater back e. m. f. than the other, a circulating current will be caused thereby to flow in the closed circuit containing the fields and armatures, the direction of flow being such as to weaken the field of the motor generating the greater back e. m. f. and to strengthen the field of the other motor.

It is one of the objects of the present invention to insure that both of the series fields of the motors shall have the same amount of current passing through them. If both fields have the same number of turns, the ampere turns on both fields will be identical and the field excitation will be the same. I accomplish this object preferably by causing the current from one armature to pass through the series fields of both motors. If one motor generates a higher back e. m. f. than the other, the circulating current set up thereby in the closed circuit containing the armatures and series fields will affect both fields alike, the only effect being to change slightly the speed of the motors.

It is another object of my invention to cause the reversal of two or more motors by a single set of reversing switches.

A further object of my invention is to provide that each of the reversing switches need be only large enough to carry the current of one motor.

Referring to the accompanying drawings, Figure 1 is a simplified diagram showing one of the many forms which my invention may assume; Fig. 2, a complete wiring diagram of the invention shown in Fig. 1; Fig. 3, a complete wiring diagram of a modified form of my invention; and Fig. 4, a simplified diagram of Fig. 3.

Referring first to Fig. 1, A' and A² represent two armatures; and F' and F², the field windings for the armatures A' and A² respectively. The positive line is connected through the switch S' to the junction $j'$, from which lead the branch wires $w'$ and $w^2$ connected respectively to the left-hand terminals of the armatures A' and A². The remaining terminal of the armature A² is connected through the adustable resistance R² to the junction $j^2$, to which is connected one terminal of the resistance R', the remaining terminal thereof being connected to the negative line. The remaining terminal of the armature A' is connected to the junction $j^3$, from which lead the wires $w^3$ and $w^4$ connected to one contact of the switches S² and S³. The remaining contact of the switch S² is connected to the junction $j^4$, which is connected by the wire $w^5$ to one terminal of the field F' and by the wire $w^6$ to one contact of the switch S⁵. The remaining terminal of the field F' is connected to one terminal of the field F², the remaining terminal thereof being led to the junction $j^5$, to which the remaining contact of the switch S³ is connected. The junction $j^5$ is connected to one contact of the switch S⁴, the remaining contact thereof being connected to the junction $j^6$ which is joined by the wire $w^7$ to the remaining contact of the switch S⁵ and by the wire $w^8$ to the junction $j^2$. The resistance R' is divided into the sections $r'$, $r^2$, and $r^3$ which are governed by the switches S⁶, S⁷, S⁸, respectively, in a well known manner. Supposing the switches S' to S⁵ to be in their full-line positions, current passes from the positive line through the line switch S' to the junction $j'$ where it divides, one branch flowing through the wire $w^2$, the armature A², resistance R² to the junction $j^2$, the other branch flowing through the wire $w'$, the armature A', the junction $j^3$, the wire $w^3$, the switch S², the junction $j^4$, the wire $w^5$, the fields F' and F² in series, the junction $j^5$, the switch S⁴, the junction $j^6$, and the wire $w^8$ to the junction $j^2$, where it joins the current from the armature A². From the junction $j^2$ the current from both armatures flows through the resistance R' to the negative line. The speed of the armature may be increased by closing successively the switches S⁶, S⁷ and S⁸, and thereby successively short-circuiting the resistance sections $r'$, $r^2$, and $r^3$ in a manner well understood. To reverse the motors, the switches $S^2$ to $S^5$ are moved to their dotted positions. The current flows from the positive line through the switch $S'$ to the junction $j'$ where it divides as before, one branch passing through the wire $w^2$, the armature $A^2$ and the resistance $R^2$ to the junction $j^2$ as before; the other branch passing through the wire $w'$, the armature $A'$, the junction $j^3$, the wire $w^4$, the switch $S^3$, the junction $j^5$, the fields $F^2$ and $F'$, the wire $w^5$, the junction $j^4$, the wire $w^6$, the switch $S^5$, the wire $w^7$, the junction $j^6$, and the wire $w^8$ to the junction $j^2$, whence the two branches of the current flow through the resistance $R'$ as before. As the current flows in a reverse direction through the fields only of the two motors, the armatures will rotate in a reverse direction as compared with that in which they rotate when the switches occupy their full-line positions. To stop the motors, the switch $S'$ is opened. Thus it is seen that the current flowing through the fields of both motors is the same and that consequently the motors will, other conditions being the same, divide the load equally, as hereinbefore explained. To compensate for the resistance of the series fields in circuit with the armature $A'$, I place the adjustable resistance $R^2$ in series with the armature $A^2$. It is also readily seen that none of the reversing switches $S^2$ to $S^5$ carries any of the current from the armature $A^2$. Consequently, these switches need not be so large as required in the usual reversing switches which are required to carry the current from both armatures. It is also seen that I accomplish the reversal of both motors with but a single set of reversing switches.

In Fig. 2, I have shown the wiring diagram complete together with the preferred form of magnetic switches and master controller. The switches $S'$ to $S^8$ are provided with the actuating windings $s'$ to $s^8$, respectively, one terminal of each winding being connected to the control wire $w^9$ which branches from the positive line at the junction $j^7$. The master switch $c$ is provided with the arm $C'$ provided with the brush $c^{13}$ which is arranged to engage the fixed contacts $c'$ to $c^6$ when moved in the "forward" direction, and the fixed contacts $c^7$ to $c^{12}$ when moved in the "reverse" direction. The following contacts are connected in pairs: $c'$ and $c^7$, $c^3$ and $c^9$, $c^4$ and $c^{10}$, $c^5$ and $c^{11}$, and $c^6$ and $c^{12}$, the latter being connected to the negative line. The remaining terminal of the winding $s'$ is connected to the contact $c^7$; of the windings $s^2$ and $s^4$, to the contact $c^2$; of the windings $s^3$ and $s^5$, to the contact $c^8$; and of the windings $s^6$, $s^7$, and $s^8$, to the contacts $c^3$, $c^4$, and $c^5$, respectively. When the arm $C'$ of the master switch is thrown to the first position in the "forward" direction, the brush $c^{13}$ connects the contacts $c'$ and $c^2$ to the negative contact $c^6$, and causes the energization of the windings $s'$, $s^2$, and $s^4$ of the switches $S'$, $S^2$, and $S^4$ and the consequent closing of the same. The motor circuits are the same as already described in connection with Fig. 1 with the switches $S'$ $S^2$, and $S^4$ closed. To increase the motor speed the arm $C'$ is advanced step by step to positions 2, 3, and 4, whereby the windings $s^6$, $s^7$, and $s^8$ are successively energized, causing the switches $S^6$, $S^7$, and $S^8$ to be successively closed to successively short-circuit the resistance sections $r'$, $r^2$, and $r^3$ in a manner well understood. To stop the motors, the arm $C'$ is moved to the central position shown on Fig. 2, whereupon all the switches open. To reverse the motors, the arm $C'$ is thrown to position 1 in the "reverse" direction, which causes the brush $c^{13}$ to connect the contacts $c^7$ to $c^8$ to the negative contact $c^{12}$. The windings $s'$, $s^3$, and $s^5$ are thereby energized causing the closing of the switches $S'$, $S^3$, and $S^5$. The motor circuits are the same as those described in connection with Fig. 1 when the switches $S'$, $S^3$, and $S^5$ are closed. To stop the motors the arm $C'$ is returned to the central position.

Referring now to Fig. 3, I show the magnetic reverser B in place of the four reversing switches shown on Figs. 1 and 2. This reverser B has the fingers $b'$, $b^2$, $b^3$, $b^4$, and $b^{12}$ which make contact on one side with the contacts $b^5$, $b^6$, and $b^{13}$ when the solenoid $b^{10}$ is energized, and on the other side with the contacts $b^7$, $b^8$, $b^9$, and $b^{14}$ when the solenoid $b^{11}$ is energized. When the arm $C'$ of the master switch $C^2$ is moved to position 1 in the "forward" direction, the brush $c^{13}$ connects the contact $c^{14}$ to the negative contact $c^6$, permitting current to flow from the positive line through the auxiliary switch $a$ and the solenoid winding $b^{11}$, which being energized causes the fingers $b'$, $b^2$, $b^3$, $b^4$, and $b^{12}$ to engage with the contacts $b^7$, $b^8$, $b^9$, and $b^{14}$. As soon as the finger $b^{12}$ engages the contact $b^{14}$, a circuit is completed from the positive line through the winding $s'$ of the line switch $S'$, which causes the closing of the said switches and the completion of the motor circuits as follows: from the positive line through the switch $S'$, the junction $j'$ where the current divides, one branch going through the wire $w^2$, the armature $A^2$, and the adjustable resistance $R^2$ to the junction $j^2$ and thence through the resistance $R'$ to the negative line; the other branch going through the wire $w'$, the armature $A'$, the finger $b'$, the contacts $b^7$ and $b^9$, the finger $b^4$, the fields $F^2$ and $F'$ from right to left, the finger $b^2$, the contact $b^8$, and the finger $b^3$ to the said junction $j^2$. To increase the speed of the motors, the arm is moved step by step to the positions 2, 3, and 4, which causes the successive energization of the windings $s^6$, $s^7$, and $s^8$ and the consequent successive closing of the switches $S^6$, $S^7$, and $S^8$, whereby the resistance sections $r'$, $r^2$, and $r^3$ are successively short-circuited, in an evident manner. To stop the motors the arm C′ is brought to the off-position shown on Fig. 3, causing all the switches to open except the reversing switch B. When the arm C′ is moved to position 1 in the "reverse" direction, current passes from the positive line through the auxiliary contacts $a$, the solenoid winding $b^{10}$, the contact $c^{15}$, the brush $c^{13}$ and the contact $c^{12}$ to the negative line. This circuit, energizing the winding $b^{10}$, causes the reverser B to operate to bring the fingers $b'$, $b^2$, $b^3$, $b^4$, and $b^{12}$ into contact with the contacts $b^5$, $b^6$, and $b^{13}$. As soon as the finger $b^{12}$, engages the contact $b^{13}$ current flows from the positive line through the winding $s'$, the finger $b^{12}$, the contact $c^{15}$, the brush $c^{13}$, and the contact $c^{12}$ to the negative line. This current energizes the winding $s'$, which causes the switch S′ to close. The motor circuits set up thereby are as follows: from the positive line through the switch S′, the junction $j'$, the wire $w^2$, the armature $A^2$, the resistance $R^2$, the junction $j^2$ and the resistance R′ to the negative line as before. At the junction $j'$ a second circuit begins and continues through the wire $w'$, the armature A′, the finger $b'$, the contact $b^5$, the finger $b^2$, the fields F′ and $F^2$ in the reverse direction, the finger $b^4$, the contact $b^6$, and the finger $b^3$ to the junction $j^2$. Since the current flows through the armatures in the same direction as before, and through the series fields in the direction the reverse of that in which it flowed before, the motor armatures will rotate in the opposite or reverse direction. As the arm C′ is moved to the positions 2, 3, and 4 the switches $S^6$, $S^7$, and $S^8$ will be actuated as before to successively cut out the resistance sections $r'$, $r^2$, and $r^3$, thereby causing the motors to increase their speed step by step. Connection through the solenoid windings $b^{10}$ and $b^{11}$ is made through the auxiliary contact $a$ which opens the solenoid circuits when the switch S′ is closed, and closes them when the said switch is opened. Thus, no current can pass through either solenoid $b^{10}$ or $b^{11}$, insuring that the reverser B cannot be moved as long as the switch S′ is closed, which is desirable in order to prevent arcs being broken on the reverser contacts.

On Fig. 4, I have shown how I prefer to connect three or more motors. I place the third armature $A^3$ and its adjustable resistance $R^3$ in parallel with the armature $A^2$ and its resistance $R^2$, and interpose the series field $F^3$ for the armature $A^3$ in series with the field $F^2$ and between the field $F^2$ and the junction $j^5$. The number of motors in parallel may be increased beyond three in the same manner. The use of additional motors does not, in my control system, require that any additional reversing switches be used, or that the carrying capacity of the same shall be greater than that required for one armature.

I desire to claim my invention broadly and do not desire to be limited to the details and combinations and arrangements shown except where the prior art makes the same necessary.

I claim—

1. In an electric motor system, the combination of two or more armatures arranged in parallel, and a field for each armature, said fields being arranged in series with each other and with only one of the armatures.

2. In an electric motor system, the combination of two or more armatures arranged in parallel, a field for each armature, said fields being arranged in series with each other and with one of the armatures, and a resistance in series with each armature not in the circuit with the said fields.

3. In an electric motor system, the combination of two or more armatures arranged in parallel, a field for each armature, said fields being arranged in series with each other and with one of the armatures, and means for reversing the direction of current flow through the said series fields to reverse the direction of rotation of the armatures.

4. Two or more motors having series windings and connected to operate in parallel, and a set of reversing switches arranged to be included in the circuit of only one of the motors.

5. Two or more armatures, series field-windings therefor, and reversing switches, each switch being connected so that only the current of one armature passes therethrough.

6. Two or more motors having series fields, and a single set of reversing switches for reversing the direction of current flow through the series field of all the said motors.

7. Two or more motors having some but not all the armatures in series with the fields, and a single set of reversing switches for reversing the direction of current flow through the fields of all the motors.

Signed at Cleveland, Ohio, this 21st day of May, 1909.

ARTHUR C. EASTWOOD.

Witnesses:
H. M. DIEMER,
R. I. WRIGHT.